US008249752B2

(12) United States Patent
Suzuki

(10) Patent No.: US 8,249,752 B2
(45) Date of Patent: Aug. 21, 2012

(54) FLOW RATE MEASURING SYSTEM

(75) Inventor: Shin Suzuki, Tokyo (JP)

(73) Assignee: Azbil Corporation, Tokyo (JP)

( * ) Notice: Subject to any disclaimer, the term of this patent is extended or adjusted under 35 U.S.C. 154(b) by 540 days.

(21) Appl. No.: 12/565,368

(22) Filed: Sep. 23, 2009

(65) Prior Publication Data

US 2010/0082168 A1    Apr. 1, 2010

(30) Foreign Application Priority Data

Sep. 30, 2008   (JP) .................................. 2008-252630

(51) Int. Cl.
*G05D 7/00*    (2006.01)
(52) U.S. Cl. ......................................... 700/283; 702/45
(58) Field of Classification Search .................. 700/283; 702/45, 184; 141/94; 73/861.16
See application file for complete search history.

(56) References Cited

U.S. PATENT DOCUMENTS

| | | | |
|---|---|---|---|
| 4,369,031 A | 1/1983 | Goldman et al. | |
| 4,651,286 A * | 3/1987 | Fukai et al. | 702/45 |
| 5,038,268 A * | 8/1991 | Krause et al. | 700/16 |
| 6,530,402 B2 * | 3/2003 | Suzuki et al. | 141/94 |
| 6,804,613 B2 * | 10/2004 | Ishikawa et al. | 702/45 |
| 7,310,582 B2 * | 12/2007 | Ishikawa | 702/45 |
| 7,546,212 B2 * | 6/2009 | Schrag et al. | 702/45 |
| 7,950,464 B2 * | 5/2011 | Atencio et al. | 166/360 |
| 8,046,194 B2 * | 10/2011 | Rufer et al. | 702/184 |
| 2002/0000259 A1 | 1/2002 | Suzuki et al. | |
| 2006/0013208 A1 | 1/2006 | Rietschel et al. | |
| 2009/0007968 A1 | 1/2009 | Knecht et al. | |
| 2011/0166689 A1 * | 7/2011 | Alden et al. | 700/108 |
| 2012/0057620 A1 * | 3/2012 | Yamamoto et al. | 375/211 |

FOREIGN PATENT DOCUMENTS

| | | |
|---|---|---|
| JP | 2001-213498 A | 8/2001 |
| JP | 2001-348092 A | 12/2001 |
| WO | 2006/069930 A2 | 7/2006 |

* cited by examiner

*Primary Examiner* — Dave Robertson
(74) *Attorney, Agent, or Firm* — McDermott Will & Emery LLP

(57) ABSTRACT

In a slave electromagnetic flow meter, the synchronization signal from a master electromagnetic flow meter (that is, a master electromagnetic signal) MPs is monitored, and if the master synchronization signal MPs ceases to be received, then the synchronization signal used for the flow rate measurement is switched to a synchronization signal Ps that is generated by the synchronization signal generating unit of the slave electromagnetic flow meter, and the switched synchronization signal Ps is defined as the master synchronization signal MPs' for the slave electromagnetic flow meter in the next stage.

6 Claims, 9 Drawing Sheets

Clock Signal Pc

Synchronization Signal Ps

Magnetic Excitation Voltage VR

Alternating Current Flow Speed Signal S1

Sampling Signal SP1

Sampling Signal SP2

Direct Current Flow Speed Signal S2

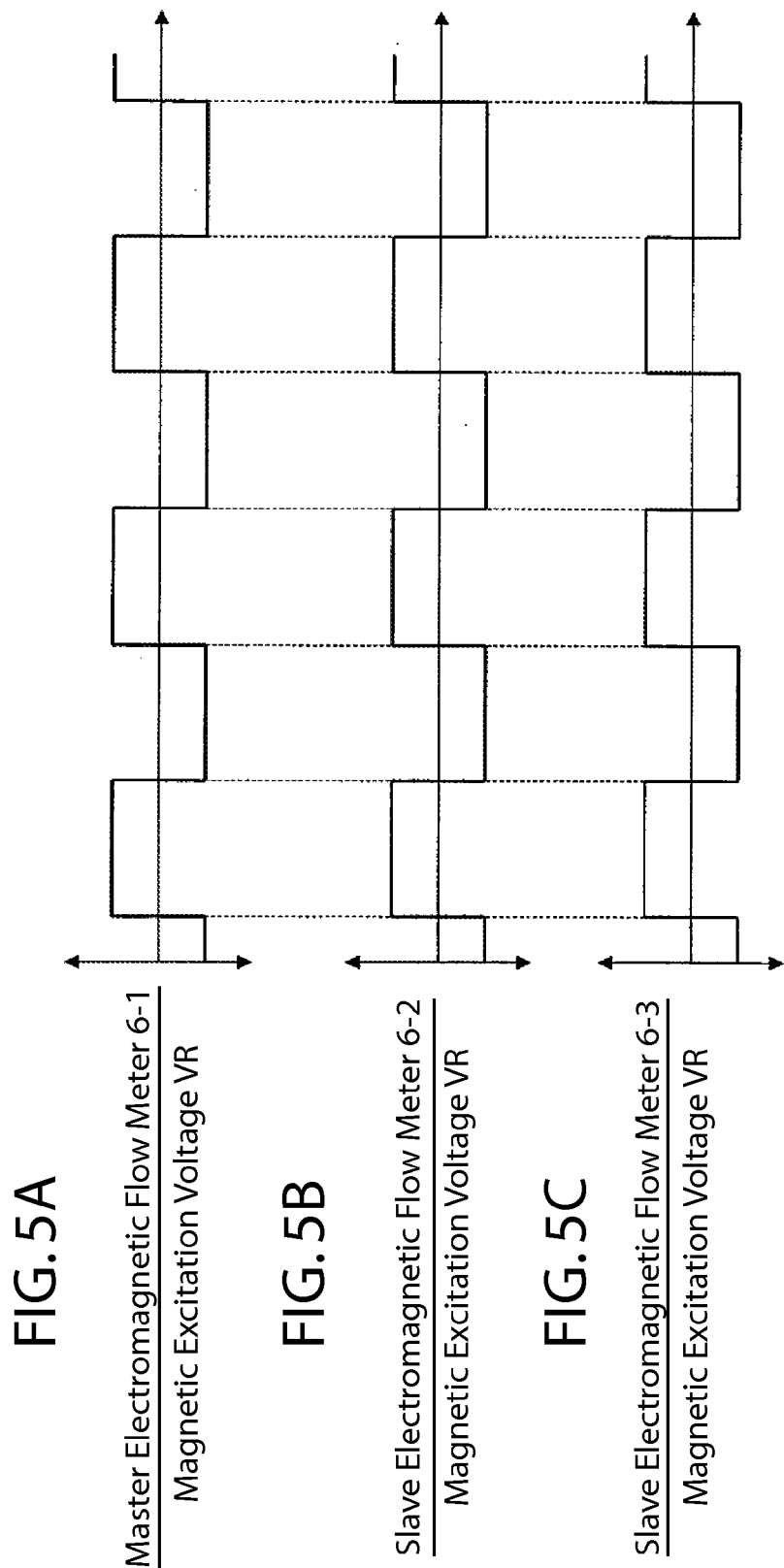

FLOW RATE MEASURING SYSTEM

CROSS REFERENCE TO PRIOR APPLICATIONS

The present application claims priority under U.S.C. §119 to Japanese Patent Application No. 2008-252630, filed Sep. 30, 2008. The content of the application is incorporated herein by reference in its entirety.

FIELD OF TECHNOLOGY

The present invention relates to a preferred flow rate measuring system used in a filling machine that fills a fluid, such as a beverage or a pharmaceutical product, into a plurality of containers.

BACKGROUND OF THE INVENTION

Conventionally, for this type of flow rate measuring system, systems have been used wherein the amount of fluid filled into the individual containers into which fluid is filled is monitored using an electromagnetic flow meter.

Because it is necessary to fill the fluid continuously into a plurality of containers, in this system the individual filling tubes for filling the fluid into the containers, and the individual electromagnetic flow meters that are provided for each individual filling tube, are disposed in proximity to each other. In particular, the degree of intimate contact between the individual flow tubes becomes high when the containers are small.

In this system, the flow rate of a fluid that flow rates in each filling tube is measured by an individual electromagnetic flow meter based on an electromotive force (an electromotive force that is generated between signal electrodes) that is generated through the application of an alternating magnetic field to the fluid within each individual filling tube. In this case, when the degree of intimate contact between the individual filling tubes is high, the differential noise that is generated at the time of switching of the square-wave excitation magnetic field (that is, at the time of switching the alternating field) will have a mutual effect on the adjacent electromagnetic flow meters as leaked magnetic flux from the magnetic excitation coils.

In the electromagnetic flow meter, the magnetic excitation timing is determined based on individual clock signals. Because of this, there will be some small variability in the magnetic excitation frequency in the individual electromagnetic flow meters. In such a case, even if initially the magnetic excitation timing matches between the individual electromagnetic flow meters, mismatch will appear in the magnetic excitation timings as time elapses. Given this, if there is a switch in the square wave magnetic field in an adjacent electromagnetic flow meter during the sampling interval of the electromotive force that occurs between the signal electrodes, then error will be included in the value measured for the flow obtained from the electromotive force. That is, a spike will occur in the alternating current flow speed signal due to the influence of the differential noise from the adjacent electromagnetic flow meter and this spike will be sampled. Because of this, the fluid fill volumes will vary between the plurality of containers, and repeatability will be poor for the fill volume.

Given this, in, Japanese Unexamined Patent Application Publication 2001-348092 ("JP '092") one of the electromagnetic flow meters, which are provided for each individual filling tube, is defined as a master flow meter, and the other electromagnetic flow meters are defined as slave electromagnetic flow meters, where the master electromagnetic flow meter and the slave electromagnetic flow meters are connected in series with a synchronization signal line, where the synchronization signal that is produced in the master electromagnetic flow meter is sent to all of the slave electromagnetic flow meters as a master synchronization signal.

In the system illustrated in JP '092, the master electromagnetic flow meter performs flow rate measurement by generating the magnetic field with the magnetic excitation timing synchronized to a synchronization signal that is generated within its own synchronization signal generating unit. The slave electromagnetic flow meters perform flow rate measurements by producing a magnetic fields with magnetic excitation timings that are synchronized to a synchronization signal that is sent, either directly or indirectly, from the master electromagnetic flow meter (that is, synchronized to a master synchronization signal). As a result, the flow rate measurements are performed by all of the electromagnetic flow meters generating the magnetic fields with identical magnetic excitation timings.

Japanese Unexamined Patent Application Publication 2001-348092

However, in the system illustrated in JP '092, if the master electromagnetic flow meter were to have a fault, if there were a fault in the synchronization signal line between the master electromagnetic flow meter and the slave electromagnetic flow meters, if there were a fault in a synchronization signal line between slave electromagnetic flow meters, if there were a fault in the circuit for receiving the synchronization signal in a slave electromagnetic flow meter, or if there were faulty communications such as noise on the synchronization signal lines, then this would produce a state wherein or more slave electromagnetic flow meters are incapable of receiving the master synchronization signal from the master electromagnetic flow meter. In this case, any slave electromagnetic flow meter that cannot receive the master synchronization signal would not be capable of performing the flow rate measurement, and thus the operation of filling the fluid into the container from the filling tube in which the slave electromagnetic flow meter is provided would be interrupted, reducing productivity.

The present invention was created in order to solve this type of problem, and the object thereof is to provide a flow rate measuring system capable of continuing flow rate measurements in a slave electromagnetic flow meter, even when there is an interruption in the synchronization signal from the master electromagnetic flow meter (that is, an interruption in the master synchronization signal) due to communication faults, or the like.

SUMMARY OF THE INVENTION

In order to achieve the object set forth above, the present invention is a flow rate measuring system, including a plurality of electromagnetic flow meters provided with synchronization signal generating means for generating synchronization signals at a predetermined frequency, wherein one of the plurality of electromagnetic flow meters is defined as a master electromagnetic flow meter and another electromagnetic flow meter is defined as a slave electromagnetic flow meter, where, in the master electromagnetic flow meter, the synchronization signal generated by the synchronization signal generating means of the master electric magnetic flow meter is defined as a master synchronization signal, and flow rate measurement is performed by generating a magnetic field with magnetic excitation timing synchronized to this master synchronization signal, and, in the slave electromagnetic flow meter, a magnetic field is generated with a magnetic excitation timing synchronized to the master synchronization signal that is sent either directly or indirectly from the master electromagnetic flow meter to perform the flow rate measurement; wherein the slave electromagnetic flow meter comprises: synchronization signal monitoring means for monitoring the master synchronization signal from the master electromagnetic flow meter and for switching the synchronization signal that is used in the flow rate measurement to a synchronization signal that is generated by the synchronization signal generating means of the slave electromagnetic flow meter, and for defining the switched synchronization signal as the master synchronization signal for a slave electromagnetic flow meter of a next stage, when the master synchronization signal from the master electromagnetic flow meter ceases to be received.

Given this invention, in, for example, the case wherein the plurality of electromagnetic flow meters is three electromagnetic flow meters, that is, a first, a second, and a third electromagnetic flow meter, then one of these three electromagnetic flow meters would be defined as the master electromagnetic flow meter, and the other two would be slave electromagnetic flow meters. For example, if the first electromagnetic flow meter were the master electromagnetic flow meter, then the second and third electromagnetic flow meters would be the first and second slave electromagnetic flow meters. In the master electromagnetic flow meter, the synchronization signal generated by the synchronization signal generating means therein would be defined as the master synchronization signal, and the master electromagnetic flow meter would perform flow rate measurements by generating the magnetic field with a magnetic excitation timing synchronized to this master synchronization signal.

Additionally, when the master synchronization signal is sent from the master electromagnetic flow meter directly to the first slave electromagnetic flow meter and sent indirectly to the second slave electromagnetic flow meter through the first slave electromagnetic flow meter, the first slave electromagnetic flow meter performs the flow rate measurement by generating the magnetic field with a magnetic excitation timing that is synchronized to the master synchronization signal that is sent directly from the master electromagnetic flow meter, and the second slave electromagnetic flow meter performs the flow rate measurement by generating the magnetic field with a magnetic excitation timing synchronized to the master synchronization signal that is sent indirectly from the master electromagnetic flow meter.

Here, however, when there is a communication fault, or the like, so that the master synchronization signal cannot be received from the master electromagnetic flow meter by the first slave electromagnetic flow meter, then the first slave electromagnetic flow meter switches the synchronization signal that is used in the flow rate measurement to a synchronization signal that is generated by its own synchronization signal generating means, and this synchronization signal is defined as the master synchronization signal for the second slave electromagnetic flow meter. As a result, the first slave electromagnetic flow meter continues the flow rate measurement using the synchronization signal that is generated by its own synchronization signal generating means. Furthermore, the second electromagnetic flow meter receives, as the master synchronization signal, the synchronization signal generated by the synchronization signal generating means of the first slave electromagnetic flow meter, and uses this master synchronization signal to continue the flow rate measurements.

While in the present invention synchronization signal monitoring means are provided in the slave electromagnetic flow meters, instead the master electromagnetic flow meter and the slave electromagnetic flow meter may have identical structures wherein the synchronization signal monitoring means provided in the slave electromagnetic flow meters are provided in the master electromagnetic flow meter as well. That is, all of the electromagnetic flow meters used in the present invention may have identical structures. In this case, selection means for setting whether to cause of functioning as the master electromagnetic flow meter or to cause functioning as a slave electromagnetic flow meter are provided in each individual electromagnetic flow meter. As a result, the electromagnetic flow meters used in the present invention will be of a single model. Additionally, any of the electromagnetic flow meters may be set to be the master electromagnetic flow meter, making it possible to increase the number of master electromagnetic flow meters as necessary.

Additionally, in the present invention, the synchronization signal monitoring means may be provided with a function wherein, when the master synchronization signal from the master electromagnetic flow meter is monitored and the reception of the master synchronization signal from the master electromagnetic flow meter is restarted, the synchronization signal that is used in the flow rate measurement switches to the master synchronization signal for which the reception has been restarted, and this switched master synchronization signal is defined as the master synchronization signal that is sent to the slave electromagnetic flow meter in the next stage. This causes the slave electromagnetic flow meter that has ceased to receive the master synchronization signal from the master electromagnetic flow meter to fulfill the role of the master electromagnetic flow meter for the slave electromagnetic flow meter of the next stage, where, at the point in time at which the reception of the master synchronization signal from the master electromagnetic flow meter is restarted, this slave electromagnetic flow meter returns automatically again to being a slave electromagnetic flow meter.

Additionally, in the present invention, each individual electromagnetic flow meter may be provided with current operating mode notifying means for providing notification to a higher-level device as to which operating mode is the current operating mode, where an operating mode wherein the flow rate measurement is performed using a synchronization signal that is generated by the synchronization signal generating means of that particular electromagnetic flow meter is defined as the master mode, and an operating mode wherein the flow rate measurement is performed using a master synchronization signal that is sent from the electromagnetic flow meter of a previous stage is defined as the slave mode. Doing so makes it possible to compare the number of electromagnetic flow meters that are currently in master mode to the number of master electromagnetic flow meters established in the initial setup, where if the number of electromagnetic flow meters that are currently in master mode is greater than the number of master electromagnetic flow meters established in the initial setup, then it can be identified that there has been a communication fault, and that handling operations are in effect.

Additionally, in the present invention the synchronization signal monitoring means may be provided with a function for monitoring the master synchronizations signal from the master electromagnetic flow meter, and for providing notification to a higher-level device if the master synchronization signal ceases to be received from the master electromagnetic flow meter. Doing so makes it possible for the higher-level device to identify which of the slave electromagnetic flow meters has become unable to receive the master synchronization signal from the master electromagnetic flow meter, making it possible to perform promptly fault correction operations by replacing those components wherein faults have occurred.

Given the invention as set forth above, the slave electromagnetic flow meter is provided with synchronization signal monitoring means that monitor the master synchronization signal from the master electromagnetic flow meter, and which switch the synchronization signal that is used in the flow rate measurement to a synchronization signal that is generated by its own synchronization signal generating means if the master synchronization signal ceases to be received from the master electromagnetic flow meter, and defines this switched synchronization signal as the master synchronization signal to be sent to the slave electromagnetic flow meter in the next stage, and thus even if the master synchronization signal from the master electromagnetic flow meter were to stop, it is still possible for the slave electromagnetic flow meter to continue performing the flow rate measurements.

This makes it possible to prevent a loss of productivity due to interrupting the operations for filling the fluid into the container from the filling tube by enabling the flow rate measurements to continue in the slave electromagnetic flow meter even when, in the filling machine, there is a fault in the master electromagnetic flow meter, there is a fault in a synchronization signal line between the master electromagnetic flow meter and a slave electromagnetic flow meter or a fault in a synchronization signal line between slave electromagnetic flow meters, there is a fault in the circuit for receiving the synchronization signal in a slave electromagnetic flow meter, or there has been a communication fault due to noise, or the like, superimposed on a synchronization signal line.

BRIEF DESCRIPTION OF THE DRAWINGS

FIGS. 5(a)-5(c) are timing charts illustrating the phase relationships of the respective magnetic excitation voltages in the master electromagnetic flow meter and the slave electromagnetic flow meters in the one-way serial method.

DETAILED DESCRIPTION OF THE INVENTION

Figure 1:
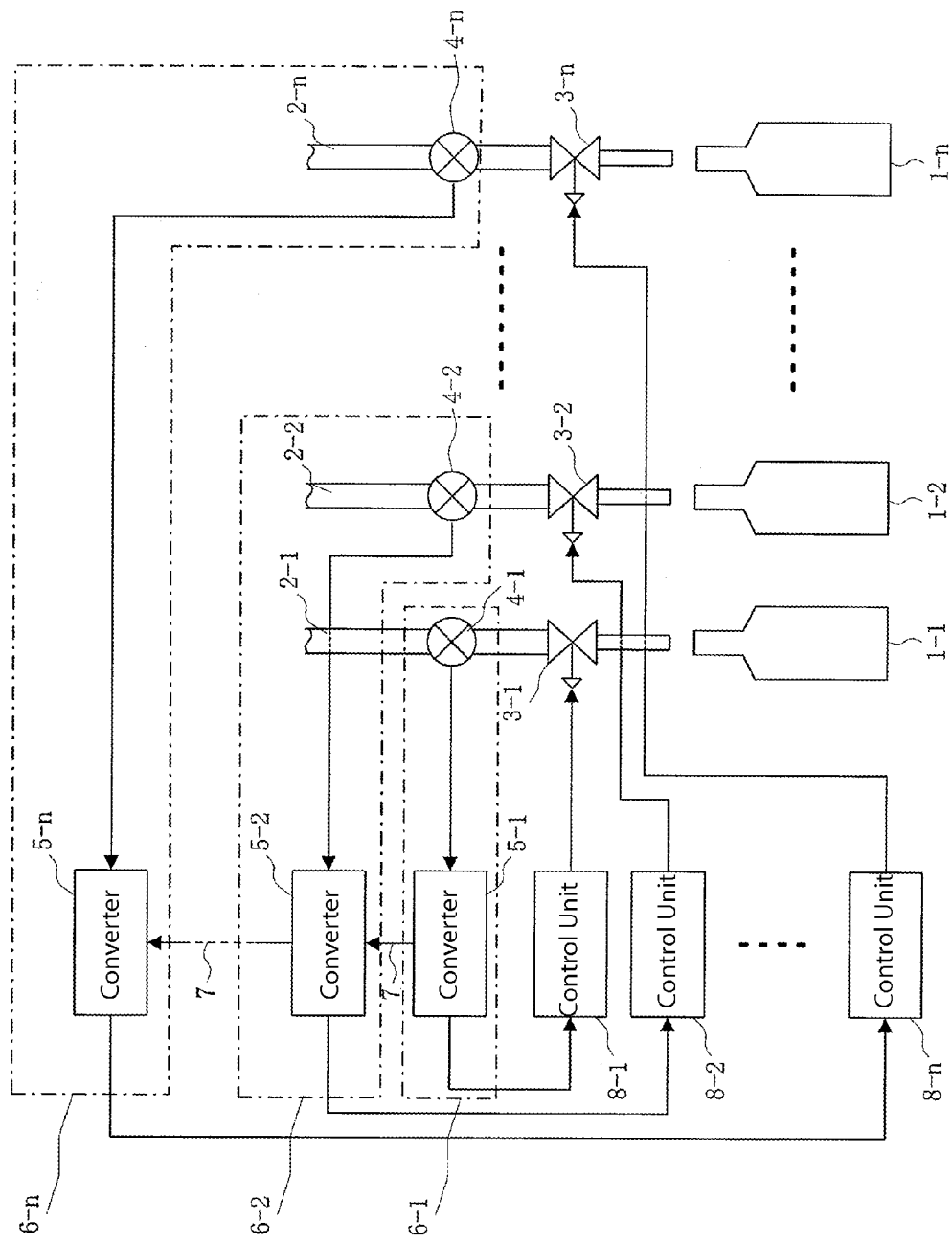
FIG. 1 is a diagram illustrating one example of the overall structure of a filling machine that uses a flow rate measuring system as set forth in the present invention.

The present invention will be explained in detail below based on the drawings. FIG. 1 is a drawing illustrating one example of the complete structure of a filling machine that uses a flow rate measuring system according to the present invention.

In this filling machine, a plurality of filling tubes 2-1 through 2-$n$ are equipped in parallel. Each of the individual filling tubes 2-1 through 2-$n$ are for filling a fluid that has electrical conductivity, such as a beverage or a pharmaceutical product, into the respective plurality of containers 1-1 through 1-$n$. The individual filling tubes 2-1 through 2-$n$ are provided with the respective valves 3-1 through 3-$n$. The individual valves 3-1 through 3-$n$ open and close the respective filling tubes 2-1 through 2-$n$ based on opening/closing signals, described below, to control the filling of the fluid into the individual containers 1-1 through 1-$n$.

Additionally, the individual filling tubes 2-1 through 2-$n$ are equipped with respective electromagnetic flow meters 6-1 through 6-$n$. The individual electromagnetic flow meters 6-1 through 6-$n$ of the individual filling tubes 2-1 through 2-$n$ are structured from the respective detectors 4-1 through 4-$n$ and converters 5-1 through 5-$n$. The filling tubes 2-1 through 2-$n$ are in proximity with each other, and so the detectors 4-1 through 4-$n$ that are attached to the individual filling tubes 2-1 through 2-$n$ are also in proximity with each other. The individual converters 5-1 through 5-$n$ are connected in series by a synchronization signal line 7.

The detectors 4-1 through 4-$n$ apply alternating magnetic fields to the fluids within the respective filling tubes 2-1 through 2-$n$, and output, to the converters 5-1 through 5-$n$, alternating current voltage signals based on the electromotive forces that are generated thereby. Additionally, the converters 5-1 through 5-$n$ perform calculation processes on the alternating current voltage signals that are outputted from the respective detectors 4-1 through 4-$n$ to calculate the flow rates of the fluid that flow rates through the filling tubes 2-1 through 2-$n$. Flow rate signals that indicate the flow rates calculated by the converters 5-1 through 5-$n$ are outputted to respective control units 8-1 through 8-$n$.

The individual control units 8-1 through 8-$n$ output opening/closing signals to the valves 3-1 through 3-$n$ that are equipped in the individual filling tubes 2-1 through 2-$n$. The individual control units 8-1 through 8-$n$, after outputting opening signals, calculate the respective fill volumes of the fluids filled into the individual containers 1-1 through 1-$n$ based on the flow rate signals outputted from the converters 5-1 through 5-$n$ of the individual electromagnetic flow meters 6-1 through 6-$n$ after the individual valves 3-1 through 3-$n$ have been opened, and, at the point of time that the fill volume has reached the set value, output closing signals to close the respective individual valves 3-1 through 3-$n$. The set values that are the criteria for the individual control units 8-1 through 8-$n$ outputting the closing signals are adjusted individually for the individual control units 8-1 through 8-$n$ prior to the shipping of the filling machine so that all of the containers 1-1 through 1-$n$ will be filled with the same volume of fluid even if there are variations in temperature, humidity, or the like.

Figure 2:
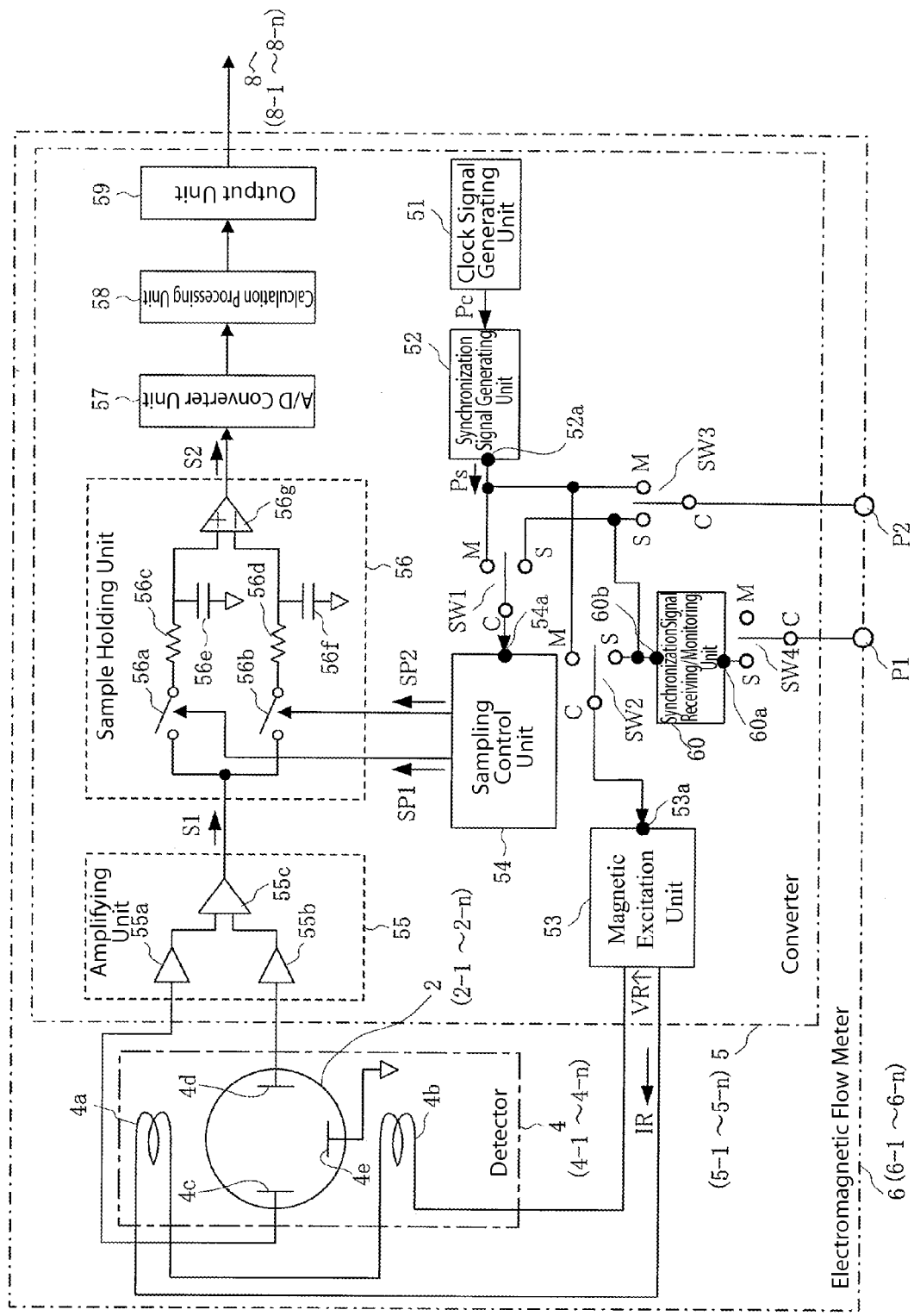
FIG. 2 is a block diagram illustrating the critical components within the electromagnetic flow meter used in this filling machine.

Next the electromagnetic flow meter used in the system illustrated in FIG. 1 is explained further. In FIG. 1, all of the electromagnetic flow meters 6-1 through 6-$n$ have identical structures. FIG. 2 is a block diagram illustrating the critical components within the electromagnetic flow meters 6 (6-1 through 6-*n*) that are structured from the detectors 4 (4-1 through 4-*n*) and the converters 5 (5-1 through 5-*n*).

In the electromagnetic flow meter 6, the detector 4 is structured from magnetic excitation coils 4*a* and 4*b*, electrodes 4*c* and 4*d*, and a ground ring 4*e*. The magnetic excitation coils 4*a* and 4*b* are a pair of coils for generating an alternating magnetic field that is magnetically excited by a magnetic excitation current IR from the converter 5, and are disposed on the outer periphery of the filling tube 2 so that the direction of the magnetic field that is generated is perpendicular to the direction of flow within the filling tube 2.

The electrodes 4*c* and 4*d* have the tip end portions thereof facing the inner wall of the filling tube 2, attached in a direction facing perpendicularly to the magnetic field that is distributed in the filling tube 2. The ground ring 4*e* is to increase the accuracy of signal detection by the electrodes 4*c* and 4*d*, and is connected electrically to a reference voltage.

The converter 5 is structured from a clock signal generating unit 51, a synchronization signal generating unit 52, a magnetic excitation unit 53, a sampling control unit 54, an amplifying unit 55, a sample holding unit 56, an A/D converter 57, a calculation processing unit 58, an output unit 59, a synchronization signal receiving/monitoring unit 60, switches SW1 through SW4, an input terminal P1 for signals from the outside (hereinafter termed the synchronization signal receiving terminal P1), and an output terminal P2 for signals to the outside (hereinafter termed the synchronization signal sending terminal P2).

The clock signal generating unit 51 outputs a clock signal Pc that serves as the reference for the operation of the converter 5. The synchronization signal generating unit 52 performs frequency division on the clock signal Pc that is outputted from the clock signal generating unit 51 to generate a synchronization signal Ps of a specific frequency.

The magnetic excitation unit 53 applies, as a magnetic excitation voltage VR, a square wave of a specific frequency to the magnetic excitation coils 4*a* through 4*b* of the detector 4, to supply, to the magnetic excitation coils 4*a* and 4*b*, a magnetic excitation current IR. The magnetic excitation unit 53 switches the polarity of the magnetic excitation voltage VR (the magnetic excitation timing), synchronized with a synchronization signal that is supplied through the switch SW2. The synchronization signal that is provided through the switch SW2 will be described below.

The sampling control unit 54 generates sampling signals SP1 and SP2 that turn on the switches 56*a* and 56*b* of the sample holding unit 56, based on the synchronization signal that is provided through the switch SW1. The frequencies of the sampling signals SP1 and SP2 are both one-half that of the synchronization signal Ps, and the phases of the sampling signals SP1 and SP2 are offsetted from each other by one-half cycle. The synchronization signal that is supplied through the switch SW1 will be described below.

The amplifying unit 55 is structured from amplifiers 55*a* and 55*b* that perform alternating current amplification of the respective alternating current voltages from the electrodes 4*c* and 4*d* of the detector 4, and from an amplifier 55*c* that combines the alternating voltage signals that have been amplified by the individual amplifiers 55*a* and 55*b*, and outputs [the results] as the alternating current flow speed signal S.

The sample holding unit 56 is structured from a first sample holding circuit that comprises a switch 56*a*, a resistance 56*c*, and a capacitor 56*e*, from a second sample holding circuit that comprises a switch 56*b*, a resistance 56*d*, and a capacitor 56*f*, and from a derivative amplifier 56*g*. The sample holding unit 56, having this structure, samples the alternating current flow speed signal 51 in accordance with the sampling signals SP1 and SP2 that are outputted from the sampling control unit 54, and outputs the result as a direct current flow speed signal S2.

The A/D converter 57 converts the direct current flow speed signal S2, outputted from the sample holder unit 56, to a digital signal. The calculation processing unit 58 performs calculation processes on the digital signal that is outputted from the A/D converter 57, to calculate an average flow of the fluid that is flowing in the filling tube 2. The output unit 59 outputs, to the control unit 8 (FIG. 1), a digital signal indicating the average flow, outputted from the calculation processing unit 58.

The synchronization signal receiving/monitoring unit 60 monitors the master synchronization signal from the master electromagnetic flow meter, which has been sent either directly or indirectly, from the synchronization signal receiving terminal P1 through the switch SW4, and controls the connecting mode of the switches SW1 through SW3 based on whether or not this master synchronization signal is received. The master synchronization signal through the switch SW4 will be described below.

Note that the synchronization signal receiving/monitoring unit 60 passes the master synchronization signal from the master electromagnetic flow meter, received through the input terminal 60A, to output it from the output terminal 60B. The synchronization signal receiving/monitoring unit 60 corresponds to the synchronization signal monitoring means described in the present invention.

The switches SW1 through SW4 have, as connecting modes, mode M and mode S, where in mode M the common terminal C is connected to the master-side terminal M (hereinafter termed the "master-side terminal"), and in mode S the common terminal C is connected to the slave-side terminal S (hereinafter termed the "slave-side terminal").

In the switch SW1, the common terminal C is connected to the input terminal of the synchronization signal to the sampling control unit 54, the master-side terminal M is connected to the output terminal 52*a* of the synchronization signal from the synchronization signal generating unit 52, and the slave-side terminal S is connected to the slave-side terminal S of the switch SW3.

In the switch SW2, the common terminal C is connected to the input terminal 53*a* for the synchronization signal to the magnetic excitation unit 53, the master-side terminal M is connected to the output terminal 52*a* of the synchronization signal from the synchronization signal generating unit 52, and the slave-side terminal S is connected to the output terminal 60*b* of the master synchronization signal from the synchronization signal receiving/monitoring unit 60.

In the switch SW3, the common terminal C is connected to the synchronization signal sending terminal P2, the master-side terminal M is connected to the output terminal 52*a* of the synchronization signal from the synchronization signal generating unit 52, and the slave-side terminal S is connected to the slave-side terminals S of the switches SW1 and SW2.

In the switch SW4, the common terminal C is connected to the synchronization signal receiving terminal P1, and the slave-side terminal S is connected to the input terminal 60*b* of the master synchronization signal to the synchronization signal receiving/monitoring unit 6. The master-side terminal M of the switch SW4 is left open.

Of the structures set forth above, the functions of the synchronization signal generating unit 52, the sampling control unit 54, the calculation processing unit 58, the synchronization signal receiving/monitoring unit 60, and the switches SW1 through SW4 are achieved through the processing functions of a CPU. Note that these need not necessarily be achieved as processing functions of a CPU, but instead may be achieved through a hardware structure, such as circuitry.

One-Way Serial Method

Figure 3:
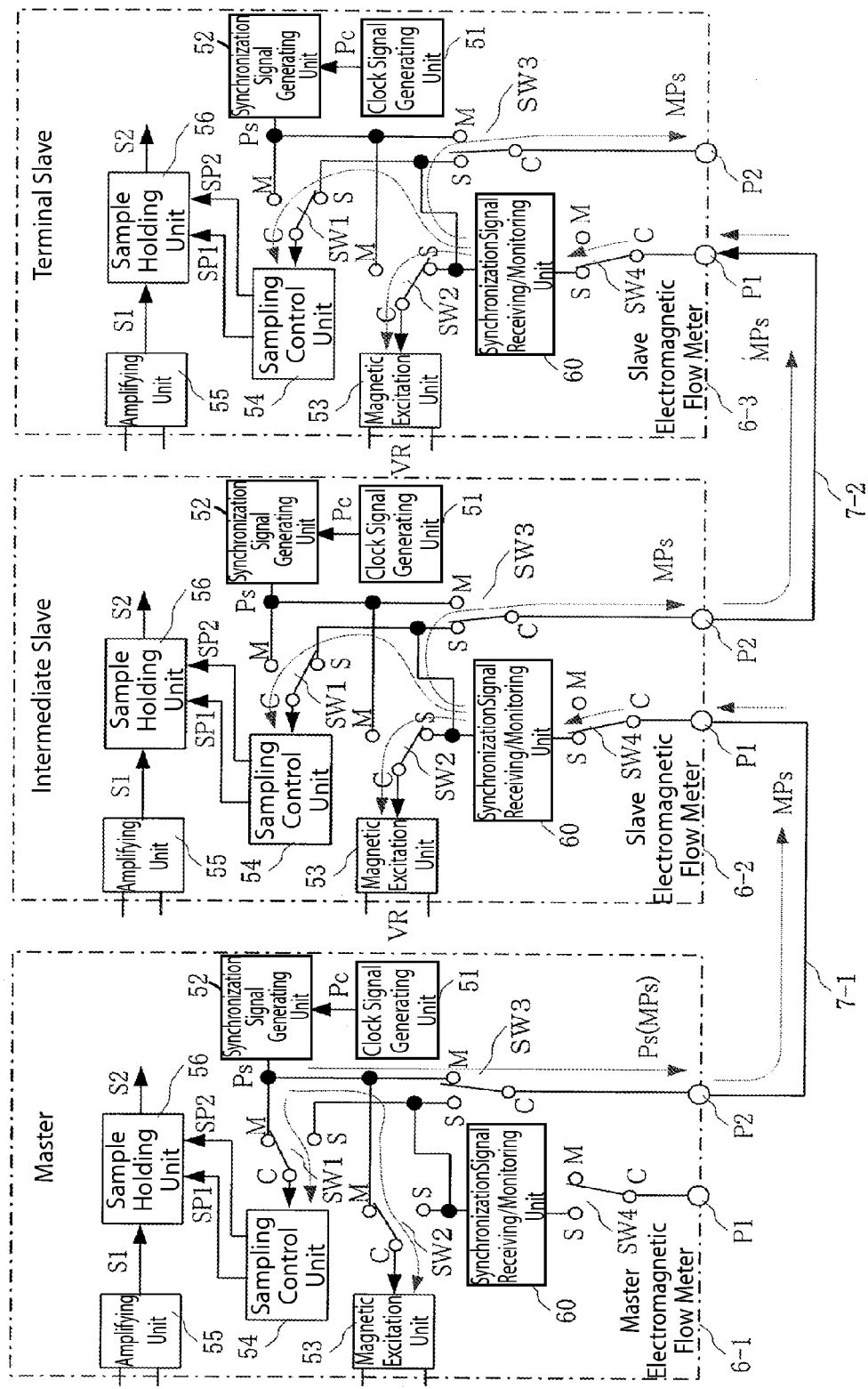
FIG. 3 is a diagram illustrating a one-way serial method as an example of a method for connecting between the electromagnetic flow meters in a filling machine using synchronization signal lines.
Figure 4A:
FIGS. 4(a)-4(g) are timing charts illustrating the signals of the various units in the master electromagnetic flow meter in the one-way serial method.
Figure 4B:
Figure 4C:
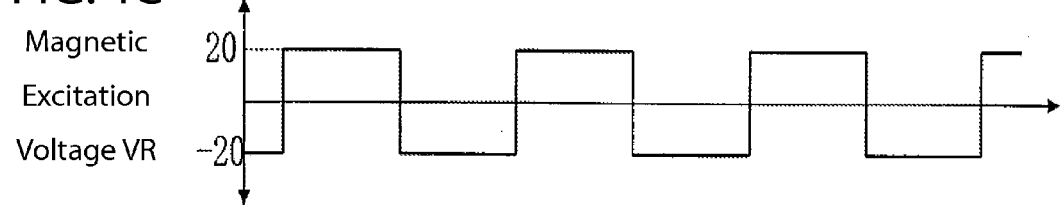
Figure 4D:
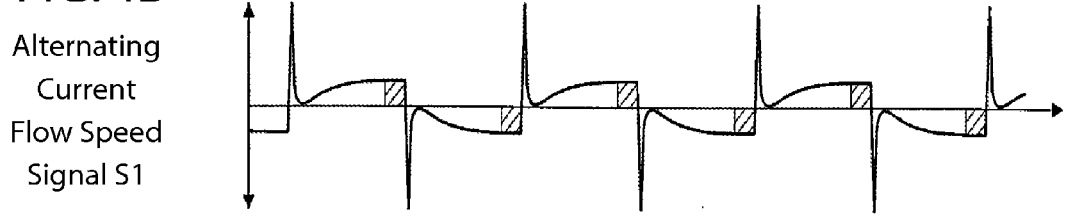
Figure 4E:
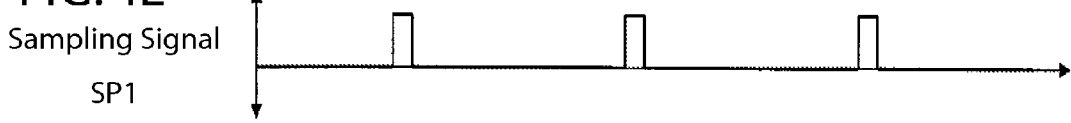
Figure 4F:
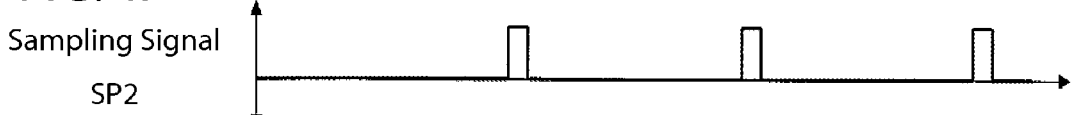
Figure 4G:
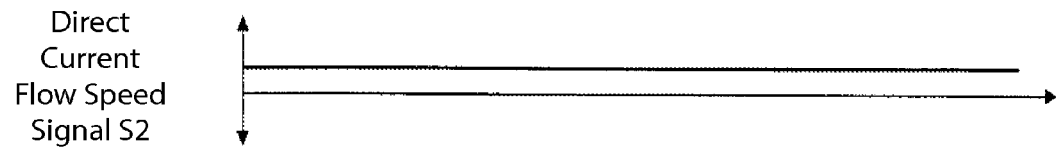

FIG. 3 illustrates the one-way serial method as an example of a method for connecting between electromagnetic flow meters 6 using synchronization signal lines 7. Note that in this example, for convenience in the explanation, it will be assumed that there are three electromagnetic flow meters 6, namely electromagnetic flow meters 6-1, 6-2, and 6-3, and a case will be explained wherein the electromagnetic flow meter 6-1 is the master electromagnetic flow meter, and the electromagnetic flow meters 6-2 and 6-3 are slave electromagnetic flow meters. Furthermore, in FIG. 3 only those components requiring explanation in the structures of the electromagnetic flow meters 6-1, 6-2, and 6-3 are selected and shown.

In this one-way serial method, the switches SW1 through SW4 in the master electromagnetic flow meter 6-1 are set to the mode M, and the switches SW1 through SW4 in the slave electromagnetic flow meters 6-2 and 6-3 are set to the mode S.

Additionally, a synchronization line 7-1 connects between the synchronization signal sending terminal P2 of the master electromagnetic flow meter 6 and the synchronization signal receiving terminal P1 of the slave electromagnetic flow meter 6-2, and a synchronization signal line 7-2 is connected between the synchronization signal sending terminal P2 of the slave electromagnetic flow meter 6-2 and the synchronization signal receiving terminal P1 of the slave electromagnetic flow meter 6-3.

Note that in this example, the electromagnetic flow meters 6-1, 6-2, and 6-3 have the switches SW1 through SW4 set in the mode S as the default settings at factory shipment. Consequently, in the example of connecting set forth in FIG. 3, the switches SW1 through SW4 are switched to the connecting mode for only the electromagnetic flow meter 6-1 that will be the master electromagnetic flow meter.

For example, the following method may be considered as a method for switching the connecting mode of the switches SW1 through SW4 in an electromagnetic flow meter 6. A master/slave function selecting switch is provided in each of the electromagnetic flow meters 6. When one wishes to set the electromagnetic flow meter 6-1 to be the master electromagnetic flow meter, the master/slave function selecting switch provided in the electromagnetic flow meter 6-1 is switched manually to switch all of the switches SW1 through SW4 in the electromagnetic flow meter 6-1 to the mode M all at once. When one wishes the electromagnetic flow meters 6-2 and 6-3 to be the slave electromagnetic flow meters, then the master/slave function selecting switches provided in the electromagnetic flow meters 6-2 and 6-3 are operated manually to switch all of the switches SW1 through SW4 in the electromagnetic flow meters 6-2 to the mode S all at once.

When Operating Normally

FIG. 4 is a timing chart illustrating the signals for each component in the master electromagnetic flow meter 6-1, where FIG. 4 (a) is the clock signal Pc that is outputted from the clock signal generating unit 51, FIG. 4 (b) is the synchronization signal Ps that is outputted from the synchronization signal generating unit 52, FIG. 4 (c) is the magnetic excitation voltage VR that is outputted from the magnetic excitation unit 53, FIG. 4 (d) is the alternating current signal 51 that is outputted from the amplifying unit 55, FIG. 4 (e) and FIG. 4 (f) are the sampling signals SP1 and SP2 there are outputted from the respective sampling control units 54, and FIG. 4 (g) is the direct current flow speed signal S2 that is outputted from the sample holding unit 56.

FIG. 5 is a timing chart illustrating the phase relationships of the magnetic excitation voltages VR in the master electromagnetic flow meter 6-1 and the slave electromagnetic flow meters 6-2 and 6-3, where FIG. 5 (a) is the magnetic excitation voltage VR in the master electromagnetic flow meter 6-1, FIG. 5 (b) is the magnetic excitation voltage VR in the slave electromagnetic flow meter 6-2, and FIG. 5 (c) is the magnetic excitation voltage VR in the slave electromagnetic flow meter 6-3.

In the master electromagnetic flow meter 6-1, the clock signal Pc that is, for example, 8 MHz, is frequency divided, as illustrated in FIG. 4 (a), in the synchronization signal generating unit 52, to generate the synchronization signal Ps of, for example, 170 Hz, as illustrated in FIG. 4 (b). The synchronization signal Ps that is generated in this synchronization signal generating unit 52 is applied to the magnetic excitation unit 53 through the switch SW2 that is in the M mode. It is also applied to the sampling control unit 54 through the switch SW1 that is in the M mode.

The magnetic excitation voltage VR, which consists of a square wave with an amplitude of 20 V, for example, as illustrated in FIG. 4 (c), is outputted from the magnetic excitation unit 53. The polarity of this magnetic excitation voltage VR switches synchronized with the synchronization signal Ps, and so the frequency of the magnetic excitation voltage VR is 85 Hz. Consequently, a magnetic field that is alternating at 85 Hz is generated from the magnetic excitation coils 4a and 4b (FIG. 2).

When the magnetic field is applied to the fluid within the filling tube 2, the electromagnetic excitation produces an electromotive force having an amplitude that is proportional to the average flow speed, in the direction perpendicular to both the direction of the magnetic field and the direction of flow of the fluid. The alternating current voltage signal that is based on this electromotive force is picked up by the pair of electrodes 4c and 4d, and after alternating current amplification by the amplifying unit 55, is outputted to the sample holding unit 56 as the alternating current flow speed signal 51.

On the other hand, the synchronization signal Ps that is generated by the synchronization signal generating unit 52 of the master electromagnetic flow meter 6-1 is sent to the synchronization signal sending terminal P2 through the switch SW3, which is in the M mode, to be outputted as the master synchronization signal MPs. This master synchronization signal MPs that is outputted from the master electromagnetic flow meter 6-1 is sent to the synchronization signal receiving terminal P1 of the slave electromagnetic flow meter 6-2 through the synchronization signal line 7-1, to be received by the synchronization signal receiving/monitoring unit 60 of the slave electromagnetic control meter 6-2 through the switch SW4, which is in the S mode.

The synchronization signal receiving/monitoring unit 60 of the slave electromagnetic flow meter 6-2 passes the master synchronization signal MPs that has been received from the master electromagnetic flow meter 6-1 to send to the slave-side terminals S of the switches SW1, SW2, and SW3. The master synchronization signal MPs that has been sent to the slave-side terminal S of the switch SW1 is applied to the sampling control unit 54. The master synchronization signal MPs that is sent to the slave-side terminal S of the switch SW2 is applied to the magnetic excitation unit 53.

On the other hand, the master synchronization signal MPs that is sent to the slave-side terminal S of the switch SW3 of the slave electromagnetic flow meter 6-2 is sent to the synchronization signal receiving terminal P1 of the slave electromagnetic flow meter 6-3 through the synchronization signal line 7-2, to be received by the synchronization signal receiving/monitoring unit 60 of the slave electromagnetic flow meter 6-3 through the switch SW4.

The synchronization signal receiving/monitoring unit 60 of the slave electromagnetic flow meter 6-3 passes the master synchronization signal MPs that is received from the slave electromagnetic flow meter 6-2, or in other words, passes the master synchronization signal MPs that has been sent from the master electromagnetic flow meter 6-1, via the slave electromagnetic flow meter 6-2, and sends it to the slave-side terminals S of the switches SW1, SW2, and SW3. The master synchronization signal MPs that is sent to the slave-side terminal S of the switch SW1 is applied to the sampling control unit 54. The master synchronization signal MPs that is sent to the slave-side terminal S of the switch SW2 is applied to the magnetic excitation unit 53.

Note that the master synchronization signal MPs that is sent to the slave-side terminal S of the switch SW3 is sent to the synchronization signal sending terminal P2, but because no synchronization signal line 7 is connected to the synchronization signal sending terminal P2, this is the ultimate terminal point. As a result, the master electromagnetic flow meter 6-1 is the master, the slave electromagnetic flow meter 6-2 is an intermediate slave, and the slave electromagnetic flow meter 6-3 is a terminal slave, tying together the transmission of the master synchronization signal MPs in one direction from the master electromagnetic flow meter 6-1.

In this way, the master synchronization signal MPs is sent from the master electromagnetic flow meter 6-1 to the slave electromagnetic flow meters 6-2 and 6-3, where the magnetic excitation unit 53 of the electromagnetic flow meters 6-1, 6-2, and 6-3 operate synchronized by the master synchronization signal MPs. Because of this, the phases of the magnetic excitation voltages VR that are outputted from the respective electromagnetic flow meters 6-1, 6-2, and 6-3, or in other words, the timing of the magnetic excitation in the electromagnetic flow meters 6-1, 6-2, and 6-3, are perfectly aligned for the electromagnetic flow meters 6-1, 6-2, and 6-3 as illustrated in FIGS. 5 (*a*), (*b*), and (*c*).

Differential noise is produced when the polarity of the magnetic excitation voltage VR switches. Consequently, in the embodiment the differential noise that is caused by the magnetic excitation voltages VR in the electromagnetic flow meters 6-1, 6-2, and 6-3 will all be reduced simultaneously. Because of this, even if, for example, in the electromagnetic flow meter 6-1, the differential noise from the adjacent magnetic flow meters 6-2 and 6-3 were to be superimposed on the alternating current voltage signals based on the electromotive force, the appearance of the spikes in the alternating current flow speed signal S1 would only be at the beginning portion of each pulse, as illustrated in FIG. 4 (*d*). As a result, the sampling interval for the alternating current flow speed signal S1 can be set to the end portion of each pulse, as illustrated in FIGS. 4 (*e*) and (*f*) to prevent the spikes from being sampled in the electromagnetic flow meter 6-1. The sampling of the spikes can be prevented similarly in the electromagnetic flow meters 6-2 and 6-3, as well.

When there is a Fault

Let us assume that there is a communication fault, such as noise on the synchronization signal line 7-1 between the master electromagnetic flow meter 6-1 and the slave electromagnetic flow meter 6-2 in the embodiment. (See FIG. 6.) In this case, the transmission of the master synchronization signal MPs from the master electromagnetic flow meter 6-1 to the slave electromagnetic flow meter 6-2 is cut off.

In the slave electromagnetic flow meter 6-2, the synchronization signal receiving/monitoring unit 60 monitors the master synchronization signal MPs from the master electromagnetic flow meter 6-1, and when the reception of the master synchronization signal MPs from the master electromagnetic flow meter 6-1 ceases, the connecting mode of the switches SW1 through SW3 switches from the mode S to the mode M.

As a result, in the slave electromagnetic flow meter 6-2, the synchronization signal Ps that is generated in the synchronization signal generating unit 52 of the slave electromagnetic flow meter 6-2 is provided to the sampling control unit 54 through the switch SW1, which has switched into the mode M. Additionally, the synchronization signal Ps that is generated by the synchronization signal generating unit 52 of the slave electromagnetic flow meter 6-2 is also applied to the magnetic excitation unit 53 through the switch SW2 that is in the mode M. Additionally, the synchronization signal Ps that is generated by the synchronization signal generating unit 52 of the slave electromagnetic flow meter 6-2 is sent to the synchronization signal sending terminal P2 through the switch SW3 that is in the mode M, to be outputted as the master synchronization signal MPs'.

As a result, the slave electromagnetic flow meter 6-2 not only performs the flow rate measurement using the synchronization signal Ps that is generated by the synchronization signal generating unit 52 of the slave electromagnetic flow meter 6-2, but also outputs this synchronization signal Ps that is generated by the synchronization signal generating unit 52 of the slave electromagnetic flow meter 6-2 as a master synchronization signal MPs' from a master electromagnetic flow meter, and the slave electromagnetic flow meter 6-2 fulfills the role of the master electromagnetic flow meter for the slave electromagnetic flow meter 6-3 of the next stage. That is, the electromagnetic flow meter 6-2 switches from the slave that it has been until that point to become the master, becoming a second master electromagnetic flow meter.

The master synchronization signal MPs' that is outputted from the slave electromagnetic flow meter 6-2 is sent to the synchronization signal receiving terminal P1 of the slave electromagnetic flow meter 6-3 through the synchronization signal line 7-2, and is received by the synchronization signal receiving/monitoring unit 60 of the slave electromagnetic flow meter 6-3 through the switch SW4, which is in the S mode.

The synchronization signal receiving/monitoring unit 60 of the slave electromagnetic flow meter 6-3 passes the master synchronization signal MPs' that has been received from the slave electromagnetic flow meter 6-2, that is, passes the master synchronization signal MPs' from the second master electromagnetic flow meter 6-2, and sends it to the slave-side terminals S of the switches SW1, SW2, and SW3.

The master synchronization signal MPs' that has been sent to the slave-side terminal S of the switch SW1 is applied to the sampling control unit 54. The master synchronization signal MPs' that has been sent to the slave-side terminal S of the switch SW2 is applied to the magnetic excitation unit 53. The master synchronization signal MPs' that has been sent to the slave-side terminal S of the switch SW3 arrives at the synchronization signal sending terminal P2.

In this way, if there is a communication fault in the synchronization signal line 7-1 between the master electromagnetic flow meter 6-1 and the slave electromagnetic flow meter 6-2, then the slave electromagnetic flow meter 6-2 continues the flow rate measurements using the synchronization signal Ps that is generated by its own synchronization signal generating unit 53. Additionally, the synchronization signal Ps that is generated by the synchronization signal generating unit 53 of the slave electromagnetic flow meter 6-2 is sent, as the master synchronization signal MPs' from a master electromagnetic flow meter, to the slave electromagnetic flow meter 6-3 in the next stage, enabling the slave electromagnetic flow meter 6-3 to continue the flow rate measurements.

Auto Recovery

Figure 6:
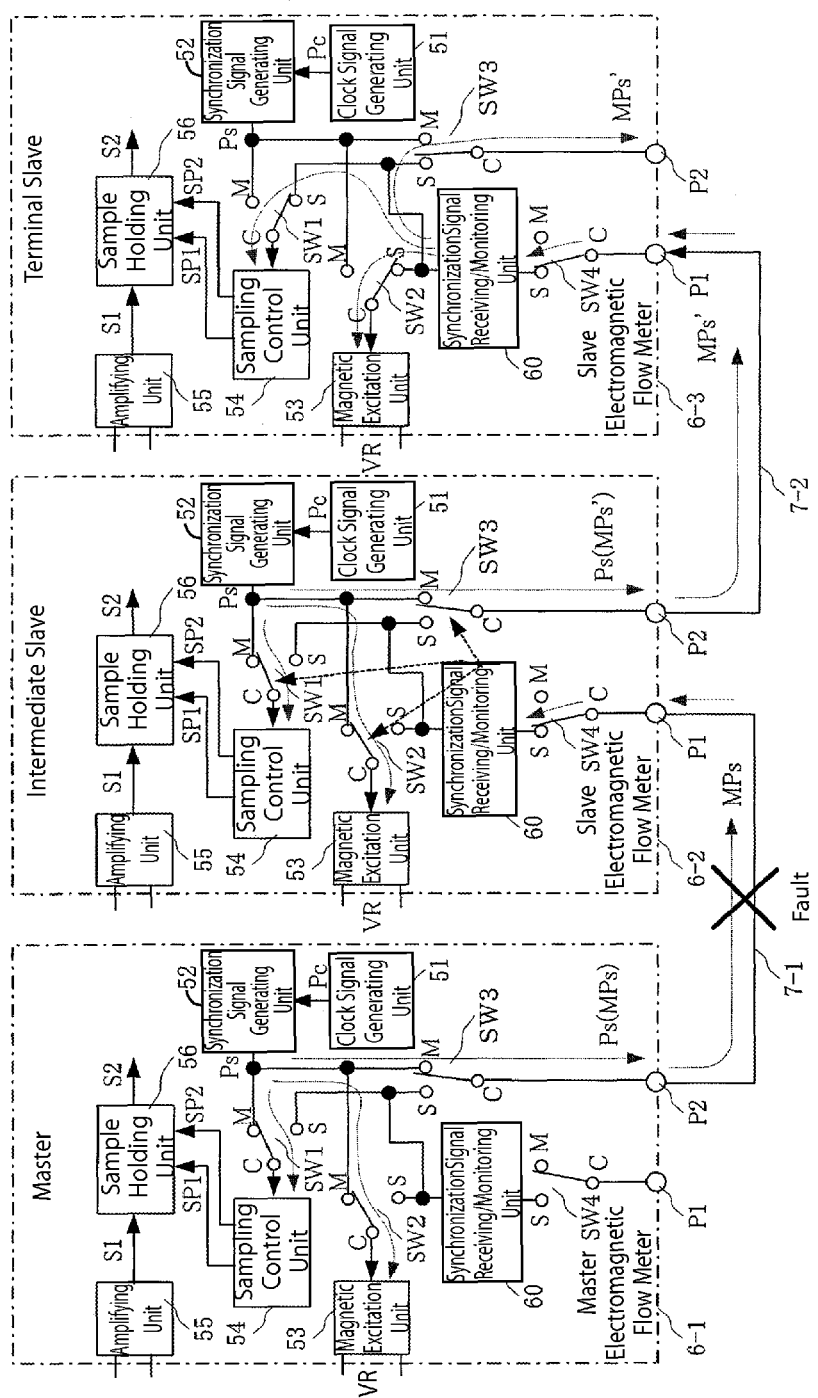
FIG. 6 is a diagram for explaining the operation in the case wherein a communication fault occurs in a synchronization signal line between the master electromagnetic flow meter and a slave electromagnetic flow meter in the one-way serial method.

In FIG. 6, when the communication fault in the synchronization signal line 7-1 between the master electromagnetic flow meter 6-1 and the slave electromagnetic flow meter 6-2 recovers, then the transmission of the master synchronization signal MPs from the master electromagnetic flow meter 6-1 to the slave electromagnetic flow meter 6-2 restarts.

In the slave electromagnetic flow meter 6-2, the synchronization signal receiving/monitoring unit 60 monitors the master synchronization signal MPs from the master electromagnetic flow meter 6-1, and when the reception of the master synchronization signal MPs from the master electromagnetic flow meter 6-1 restarts, then the connecting mode of the switches SW1 through SW3 switches from the mode M to the mode S. (See FIG. 7.)

As a result, in the slave electromagnetic flow meter 6-2, the synchronization signal to the magnetic excitation unit 53 switches to the master synchronization signal MPs from the master electromagnetic flow meter 6-1. Additionally, the synchronization signal to the sampling control unit 54 switches to the master synchronization signal MPs from the master electromagnetic flow meter 6-1. Additionally, the synchronization signal that is outputted from the synchronization signal sending terminal P2 switches to the master synchronization signal MPs from the master electromagnetic flow meter 6-1.

In this way, when the communication fault in the synchronization signal line 7-1 between the master electromagnetic flow meter 6-1 and the slave electromagnetic flow meter 6-2 recovers, then the slave electromagnetic flow meter 6-2 automatically returns to being an intermediate slave, and the flow rate measurements using the master synchronization signal MPs from the master electromagnetic flow meter 6-1 restarts. The outputting of the master synchronization signal MPs from the master electromagnetic flow meter 6-1 to the slave electromagnetic flow meter 6-3 restarts as well.

Note that while in the present example, the explanation was for a case wherein there was a communication fault in the synchronization signal line 7-1 between the master electromagnetic flow meter 6-1 and the slave electromagnetic flow meter 6-2. The same operations as set forth above are performed also when there is a fault in the master electromagnetic flow meter 6-1. A fault (open line) in the synchronization signal line 7-1 between the master electromagnetic flow meter 6-1 and the slave electromagnetic flow meter 6-2, or a fault in the receiving circuit the synchronization signal receiving/monitoring unit 60) for the synchronization signal of the slave electromagnetic flow meter 6-1, and flow rate measurements by the slave electromagnetic flow meters 6-2 and 6-3 continue.

Moreover, although in the present example a case was explained wherein there were three individual electromagnetic flow meters 6, in practice even more electromagnetic flow meters 6 are provided. An example of the connections at this time is shown schematically in FIG. 8 (*a*). In this example, the electromagnetic flow meter 6-1 is the master electromagnetic flow meter, and the slave electromagnetic flow meters 6-2 through 6-6 are connected serially to this master electromagnetic flow meter 6-1 through signal lines 7-1 through 7-5.

Figure 8:
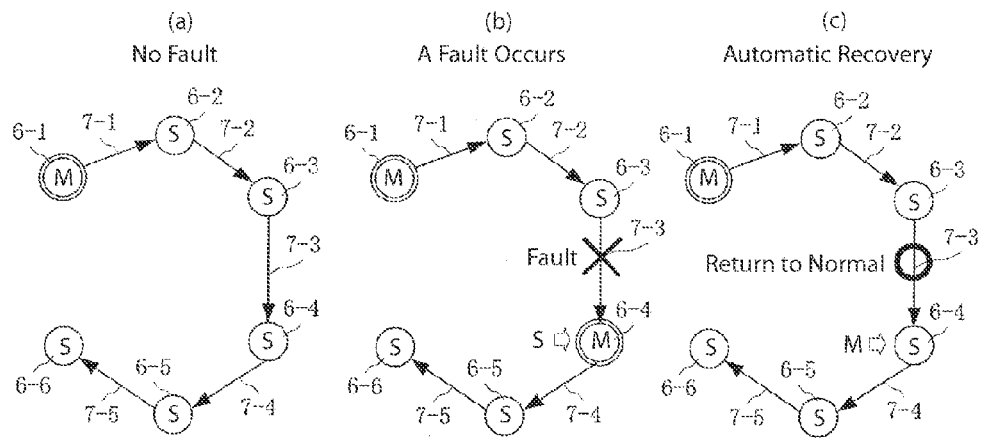
FIGS. 8(a)-8(c) are schematic diagrams illustrating an example of the connections in the case wherein even more electromagnetic flow meters are provided in the one-way serial method.

In this type of example of connections, if, for example, a communication fault were to occur in the synchronization signal line 7-3 between the slave electromagnetic flow meters 6-3 and 6-4 (as shown in FIG. 8 (*b*)), then the operating mode of the slave electromagnetic flow meter 6-4 would go into the master mode wherein the flow rate measurements are performed using the synchronization signal that is produced by the slave electromagnetic flow meter 6-4, and the slave electromagnetic flow meter 6-4 fulfills the role of being the master electromagnetic flow meter for the slave electromagnetic flow meters 6-5 and 6-6 in the subsequent stages.

As can be understood from the example of connections in FIG. 8, when many electromagnetic flow meters are provided, then when a communication fault occurs someplace between the master electromagnetic flow meter and the terminal slave electromagnetic flow meter, several slave electromagnetic flow meters change automatically to be master electromagnetic flow meters, producing multiple master electromagnetic flow meters simultaneously. If this is left as-is, then there would be the potential for the occurrence of interference between the magnetic fields.

However, in the example of embodiment, when a communication fault is resolved, then the operating mode of the slave electromagnetic flow meter that has been put into the master mode returns automatically to the original slave mode, and thus the state wherein multiple master electromagnetic flow meters have been produced simultaneously is not left as-is, making it possible to quickly eliminate the possibility of the occurrence of interference between magnetic fields.

Tree Method

In the embodiment set forth above, the method for connecting between the electromagnetic flow meters 6 using the synchronization signal lines 7 was a one-way serial method. However, the methods for connecting between the electromagnetic flow meters 6 using synchronization signal lines 7 are not limited to the one-way serial method. For example, the tree method may be used, wherein the electromagnetic flow meters 6 are connected together by synchronization signal lines 7 in the shape of a tree.

Figure 9:
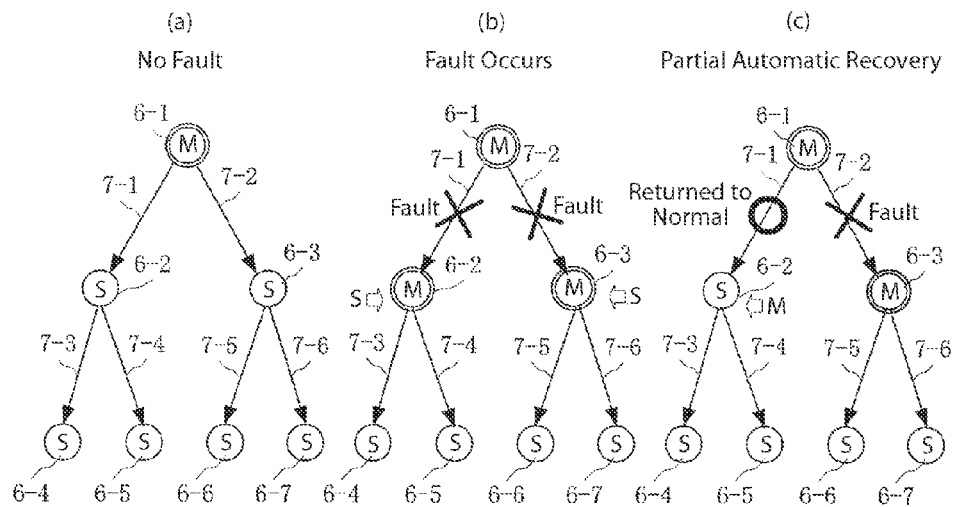
FIGS. 9(a)-9(c) are schematic diagrams illustrating an example of the connections in the case wherein the method of connecting between the electromagnetic flow meters using synchronization signal lines is the tree method.
Figure 10:
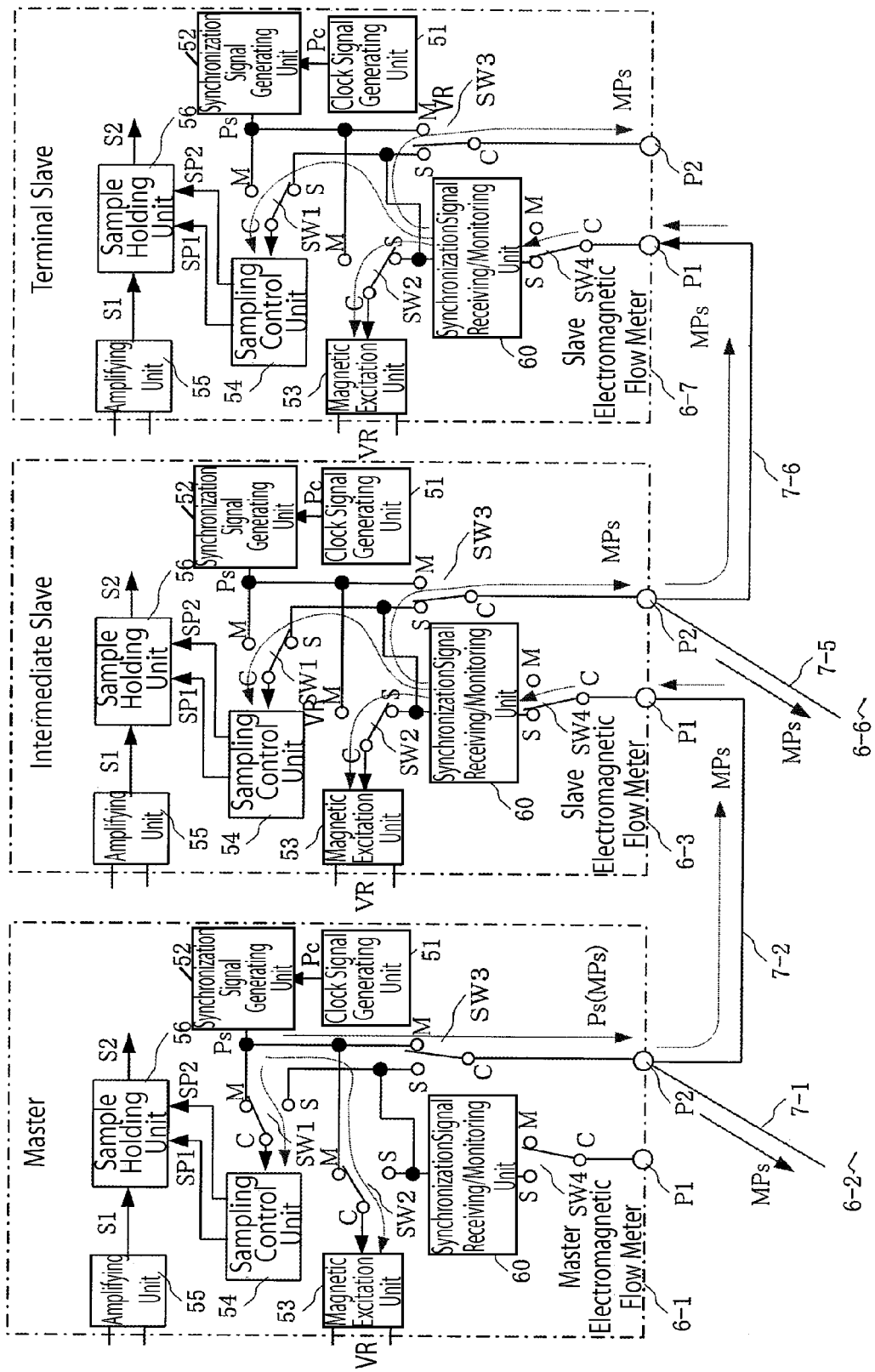
FIG. 10 is a diagram that selects for illustration a specific state of connections between the electromagnetic flow meters in the case of the tree method.

An example of connections using this method is illustrated schematically in FIG. 9 (*a*). In FIG. 9 (*a*), the electromagnetic flow meter 6-1 is defined as the master electromagnetic flow meter, and slave electromagnetic flow meters 6-2 and 6-3 are connected to the master electromagnetic flow meter 6-1 through synchronization signal lines 7-1 and 7-2, where slave electromagnetic flow meters 6-4 and 6-5 are connected to the slave electromagnetic flow meter 6-2 through synchronization signal lines 7-3 and 7-4, and slave electromagnetic flow meters 6-6 and 6-7 are connected to the slave electromagnetic flow meter 6-3 through synchronization signal lines 7-5 and 7-6. FIG. 10 selects for illustration a specific form of connections between the electromagnetic flow meters 6 in this example of connections.

In this example of connections, if there are communication faults in the synchronization signal lines 7-1 and 7-2 between the slave electromagnetic flow meters 6-2 and 6-3 (FIG. 9 (*b*)), then the operating mode for the electromagnetic flow meters 6-2 and 6-3 goes to the master mode, and the electromagnetic flow meters 6-2 and 6-3 fulfill the role of the master electromagnetic flow meters for the slave electromagnetic flow meters 6-4 and 6-5, and 6-6 and 6-7, in the next stage. Furthermore, when the communication fault in the synchronization signal line 7-1 between the master electromagnetic flow meter 6-1 and the slave electromagnetic flow meter 6-2 is corrected (FIG. 9 (*c*)), then the operating mode of the slave electromagnetic flow meter 6-2 is returned automatically to the slave mode.

Note that while in all embodiments all of the electromagnetic flow meters 6 had identical structures, it is not absolutely necessary that all of the electromagnetic flow meters 6 have identical structures. For example, in the structure illustrated in FIG. 3, the structure may be one wherein the synchronization signal receiving terminal P1, the synchronization signal receiving/monitoring unit 60, and the switches SW1 through SW4 are removed from the master electromagnetic flow meter 6-1, or the structure may be one wherein the synchronization signal sending terminal P2 and the switch SW3 have been removed from the slave electromagnetic flow meter 6-3, which is the terminal slave.

When all of the electromagnetic flow meters 6 have identical structures, then it is possible to have a single model for the electromagnetic flow meters that are used. Additionally, it becomes possible to set any of the electromagnetic flow meters to be the master electromagnetic flow meter, making it possible also to increase the number of master electromagnetic flow meters as necessary. Furthermore, if one of the master electromagnetic flow meters has a fault, then it is possible to enable the operations of filling the fluid into the containers to continue through setting up another one of the electromagnetic flow meters to be a master electromagnetic flow meter instead.

Additionally, while in the embodiments set forth above the explanation was of providing a master/slave function selecting switch in each individual electromagnetic flow meter 6, and of performing a manual operation to select and set whether the electromagnetic flow meter 6 was to function as a master electromagnetic flow meter or a slave electromagnetic flow meter, instead the electromagnetic flow meter 6 itself may determine automatically whether to function as a master electromagnetic flow meter or as a slave electromagnetic flow meter.

For example, if, after the system has been connected, no synchronization signal has been received from the higher-level over a predetermined period of time, then all of the switches SW1 through SW4 go to the mode M, to cause functioning as a master electromagnetic flow meter, and, on the other hand, setting all of the switches SW1 through SW4 to the mode S if, while monitoring for a specific period of time, the synchronization signal arrives, to cause functioning as a slave electromagnetic flow meter. Doing so will automatically cause there to be a single master electromagnetic flow meter with all of the others as slave electromagnetic flow meters after a predetermined amount of time has elapsed after the system is connected.

Additionally, in the embodiments set forth above, the operating mode wherein an individual electromagnetic flow meter 6 operates with the flow rate measurement being performed using the synchronization signal generated by that particular electromagnetic flow meter 6 is defined as the master mode, and the operating mode wherein of the flow rate measurement is performed using a master synchronization signal that is provided from the electromagnetic flow meter from the previous stage is defined as the slave mode, and a function may be provided to provide notification to a higher-level device as to which of the modes is the current operating mode.

For example, the connecting mode of the switches SW1, SW2, and SW3 may be monitored by the synchronization signal receiving/monitoring unit 60, and if the connecting mode of the switches SW1, SW2, and SW3 is the mode M, then the mode is evaluated to be the master mode, but if the mode S, then the mode is evaluated to be the slave mode, and the operating mode thus evaluated is sent to the control unit 8 through the output unit 59, and is sent to a higher-level monitoring device (not shown) from the control unit 8.

Doing so makes it possible for the higher-order monitoring device to, for example, compare the number of electromagnetic flow meters 6 that are currently set to the master mode to the number of master electromagnetic flow meters 6 that was established in the initial settings, to identify that communication faults have occurred and that handling measures are in progress if the number of electromagnetic flow meters 6 that are currently set to the master mode is greater than the number of master electromagnetic flow meters 6 that was established in the initial settings.

Additionally, in the embodiments set forth above, the synchronization signal receiving/monitoring unit 60 of each individual electromagnetic flow meter 6 may be provided with a function for monitoring the master synchronization signal from the master electromagnetic flow meter and for providing notification to the higher-order device in the event that the master synchronization signal ceases to be received. For example, the fact that the master synchronization signal has ceased to be received may be sent to the control unit 8 through the output unit 59, and then sent from the control unit 8 to the higher-level monitoring device (not shown).

Doing so makes it possible for the higher-order monitoring device to determine, for example, which of the slave electromagnetic flow meters has ceased to be able to receive the master synchronization signal, making it possible to narrow in on the location of the fault in order to perform fault recovery operations quickly.

Furthermore, one may also consider providing notification of a fault when a synchronization signal arrives despite the electromagnetic flow meter being a master electromagnetic flow meter. Furthermore, a variety of methods may be considered for the method of providing fault notification from the electromagnetic flow meter, such as stopping an output signal such as a pulse output, maximizing the output signal, holding the output signal immediately prior to the fault, ignoring the fact, or the like. Furthermore, the customer may be given the ability to select, depending on the application, the type of condition output signal method of notification. Furthermore, the user may be notified through a blinking or displaying action of a display device such as an LED or an LCD. Additionally, the fault notification may also be performed by a communication function online.

Additionally, while in the embodiments set forth above the explanation was for an example of application to a filling machine, the present invention is not limited to application to a filling machine, but may be applied to various types of systems having a plurality of electromagnetic flow meters, wherein one of the electromagnetic flow meters is defined as the master electromagnetic flow meter and the others are defined as slave electromagnetic flow meters, where magnetic excitation is performed synchronized with a synchronization signal from the master electromagnetic flow meter.

Additionally, in this type of system the number of master electromagnetic flow meters initially set up need not necessarily be limited to one, although preferably this number is small.

BRIEF DESCRIPTION OF THE DRAWINGS

FIG. 1 is a diagram illustrating one example of the overall structure of a filling machine that uses a flow rate measuring system as set forth in the present invention.

FIG. 2 is a block diagram illustrating the critical components within the electromagnetic flow meter used in this filling machine.

FIG. 3 is a diagram illustrating a one-way serial method as an example of a method for connecting between the electromagnetic flow meters in a filling machine using synchronization signal lines (the first form of embodiment).

FIGS. 4(a)-4(g) are timing charts illustrating the signals of the various units in the master electromagnetic flow meter in the one-way serial method.

FIGS. 5(a)-5(c) are timing charts illustrating the phase relationships of the respective magnetic excitation voltages in the master electromagnetic flow meter and the slave electromagnetic flow meters in the one-way serial method.

FIG. 6 is a diagram for explaining the operation in the case wherein a communication fault occurs in a synchronization signal line between the master electromagnetic flow meter and a slave electromagnetic flow meter in the one-way serial method.

Figure 7:
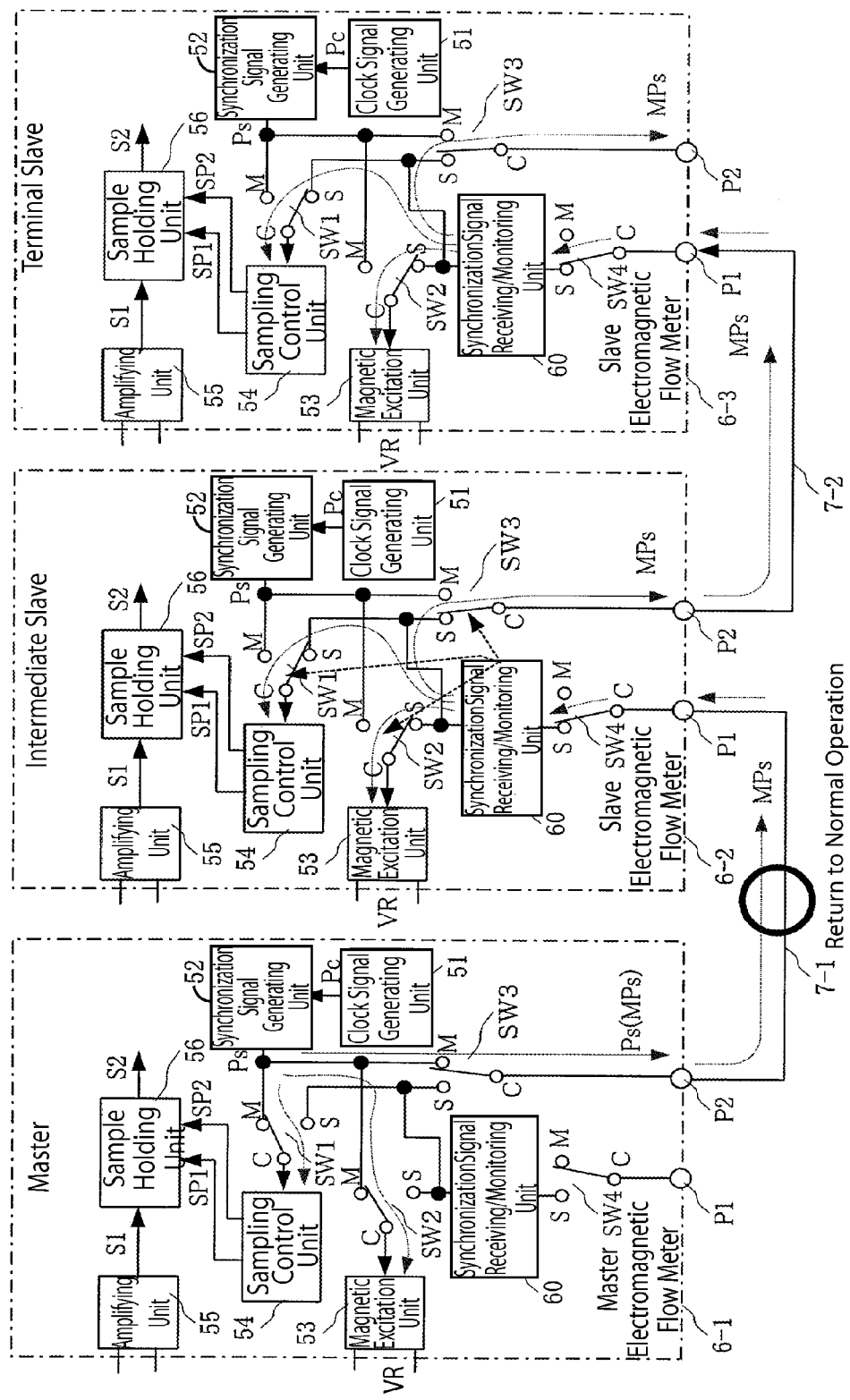
FIG. 7 is a diagram for explaining the operation when the communication fault has been corrected in the synchronization signal line between the master electromagnetic flow meter and the slave electromagnetic flow meter in the one-way serial method.

FIG. 7 is a diagram for explaining the operation when the communication fault has been corrected in the synchronization signal line between the master electromagnetic flow meter and the slave electromagnetic flow meter in the one-way serial method.

FIGS. 8(a)-8(c) are schematic diagrams illustrating an example of the connections in the case wherein even more electromagnetic flow meters are provided in the one-way serial method.

FIGS. 9(a)-9(c) are schematic diagrams illustrating an example of the connections in the case wherein the method of connecting between the electromagnetic flow meters using synchronization signal lines is the tree method.

FIG. 10 is a diagram that selects for illustration a specific state of connections between the electromagnetic flow meters in the case of the tree method.

The invention claimed is:

1. A flow rate measuring system, comprising:
a plurality of electromagnetic flow meters provided with synchronization signal generators generating synchronization signals at a predetermined frequency, wherein one of the plurality of electromagnetic flow meters is defined as a master electromagnetic flow meter and another electromagnetic flow meter is defined as a slave electromagnetic flow meter,
wherein, the synchronization signal generated by the synchronization signal generator of the master electric magnetic flow meter is defined as a master synchronization signal,
wherein flow rate measurement is performed by generating a magnetic field with magnetic excitation timing synchronized to the master synchronization signal, and, in the slave electromagnetic flow meter, a magnetic field is generated with a magnetic excitation timing synchronized to the master synchronization signal that is sent either directly or indirectly from the master electromagnetic flow meter to perform the flow rate measurement;
wherein the slave electromagnetic flow meter comprises:
a synchronization signal monitor monitoring the master synchronization signal from the master electromagnetic flow meter and switching the synchronization signal that is used in the flow rate measurement to a synchronization signal that is generated by the synchronization signal generator of the slave electromagnetic flow meter, and defining the switched synchronization signal as a second master synchronization signal for a slave electromagnetic flow meter of a next stage, when the master synchronization signal from the master electromagnetic flow meter is interrupted.

2. A flow rate measuring system as set forth in claim 1, wherein:
each electromagnetic flow meter has selection setting causing functioning as one of the master electromagnetic flow meter or the slave electromagnetic flow meter.

3. A flow rate measuring system as set forth in claim 1, wherein:
the synchronization signal monitor monitors the master synchronization signal from the master electromagnetic flow meter and, if the reception of the master synchronization signal from the master electromagnetic flow meter restarts, switches the synchronization signal that is used in the flow rate measurement to the master synchronization signal for which reception has restarted, and defines the switched master synchronization signal as the master synchronization signal for a slave electromagnetic flow meter of a next stage.

4. A flow rate measuring system as set forth in claim 1, wherein:
each electromagnetic flow meter comprises a current operating mode notifyer defining as the master mode the operating mode wherein the flow rate measurement is performed using the synchronization signal generated by the synchronization signal generator of that particular electromagnetic flow meter, for defining as the slave mode the operating mode wherein the flow rate measurement is performed using the second master synchronization signal sent from an electromagnetic flow meter of a previous stage, and for providing notification of the current operating mode to a higher-level device.

5. A flow rate measuring system as set forth in claim 1, wherein:
the synchronization signal monitor monitors the master synchronization signal from the master electromagnetic flow meter, and if the master synchronization signal from the master electromagnetic flow meter is interrupted, notifies a higher-level device of the interruption.

6. A flow rate measuring system comprising:
a plurality of filling tubes, disposed in proximity with each other, for filling a fluid into respective containers;
valves that open and close respective individual filling tubes based on opening signals and closing signals, provided for each individual filling tube;
electromagnetic flow meters, provided for each individual filling tube, each having synchronization signal generator generating a synchronization signal of a predetermined frequency, for measuring a flow rate based on an electromotive force that is produced through the application of an alternating magnetic field to the fluid in each individual filling tube, to output a flow rate signal; and
controller outputting the opening signals to respective individual valves and outputting the closing signals to respective individual valves after the opening signals have been outputted, so as to fill a uniform volume of fluid into each container based on the flow rate signals outputted from the individual electromagnetic flow meters; wherein
with one of the electromagnetic flow meters, which are provided for each of the individual filling tubes, defined as a master electromagnetic flow meter and another electromagnetic flow meter defined as a slave electromagnetic flow meter, in the master electromagnetic flow meter the synchronization signal that is generated by the synchronization signal generator of that particular master electromagnetic flow meter is defined as the master synchronization signal for performing flow rate measurements by producing the magnetic field with magnetic excitation timing that is synchronized to the master synchronization signal, and, in the slave electromagnetic flow meter, flow rate measurement is performed by generating the magnetic field with magnetic excitation timing synchronized to the master synchronization signal that is sent either directly or indirectly from the master electromagnetic flow meter; wherein
the slave electromagnetic flow meter comprises a synchronization signal monitor monitoring the master synchronization signal from the master electromagnetic flow meter, and if the master synchronization signal from the master electromagnetic flow meter is interrupted, switches the synchronization signal used in the flow rate measurement to a synchronization signal that is generated by the synchronization signal generator of that particular electromagnetic flow meter, and defines the synchronization signal after switching to be a second master synchronization signal for the slave electromagnetic flow meter of a next stage.

* * * * *